US009715768B2

United States Patent
Ampomah

(10) Patent No.: US 9,715,768 B2
(45) Date of Patent: Jul. 25, 2017

(54) ELECTRONIC TRACKING SYSTEM

(71) Applicant: George Ampomah, Worchester, MA (US)

(72) Inventor: George Ampomah, Worchester, MA (US)

( * ) Notice: Subject to any disclaimer, the term of this patent is extended or adjusted under 35 U.S.C. 154(b) by 0 days.

(21) Appl. No.: 14/964,105

(22) Filed: Dec. 9, 2015

(65) Prior Publication Data
US 2017/0169624 A1 Jun. 15, 2017

(51) Int. Cl.
*G08B 1/08* (2006.01)
*G07C 5/00* (2006.01)
*H04W 4/04* (2009.01)
*B60R 16/033* (2006.01)

(52) U.S. Cl.
CPC ............ *G07C 5/008* (2013.01); *B60R 16/033* (2013.01); *H04W 4/046* (2013.01)

(58) Field of Classification Search
CPC .................................. G06Q 10/00; G08G 1/00
See application file for complete search history.

(56) References Cited

U.S. PATENT DOCUMENTS

| 6,359,570 | B1 | 3/2002 | Adcox et al. |
| D473,152 | S | 4/2003 | Frank |
| 7,681,921 | B2 | 3/2010 | Mercer et al. |
| 8,754,751 | B1 * | 6/2014 | Picolli ..................... G01S 13/75 340/10.1 |
| 8,847,754 | B2 | 9/2014 | Buchheim et al. |
| 2005/0088320 | A1 | 4/2005 | Kovach |
| 2005/0261832 | A1 * | 11/2005 | Arnouse ............... G01S 5/0027 701/469 |
| 2008/0084305 | A1 | 4/2008 | Arnold |
| 2009/0289785 | A1 | 11/2009 | Leonard |
| 2012/0190386 | A1 | 7/2012 | Anderson |

* cited by examiner

*Primary Examiner* — Shirley Lu

(57) ABSTRACT

An electronic tracking system for electronically tracking a vehicle includes a vehicle. A decal is adhered to the vehicle and a tracking unit is coupled to the decal. The tracking unit is in electrical communication with an extrinsic communications network thereby facilitating a location of the vehicle to be tracked via the extrinsic communications network.

6 Claims, 3 Drawing Sheets

ELECTRONIC TRACKING SYSTEM

BACKGROUND OF THE DISCLOSURE

Field of the Disclosure

The disclosure relates to tracking devices and more particularly pertains to a new tracking device for electronically tracking a vehicle.

SUMMARY OF THE DISCLOSURE

An embodiment of the disclosure meets the needs presented above by generally comprising a vehicle. A decal is adhered to the vehicle and a tracking unit is coupled to the decal. The tracking unit is in electrical communication with an extrinsic communications network thereby facilitating a location of the vehicle to be tracked via the extrinsic communications network.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
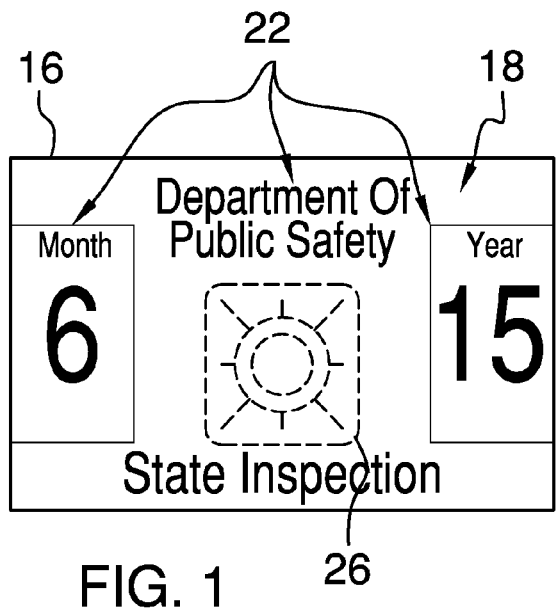
FIG. 1 is a front view of an electronic tracking system according to an embodiment of the disclosure.
Figure 2:
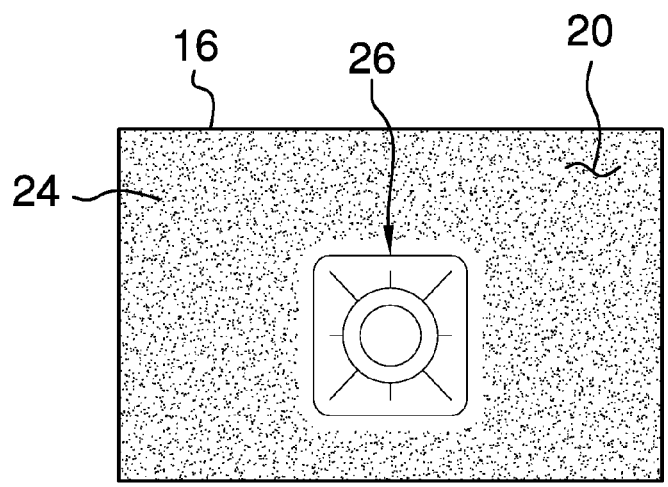
FIG. 2 is a back view of an embodiment of the disclosure.
Figure 3:
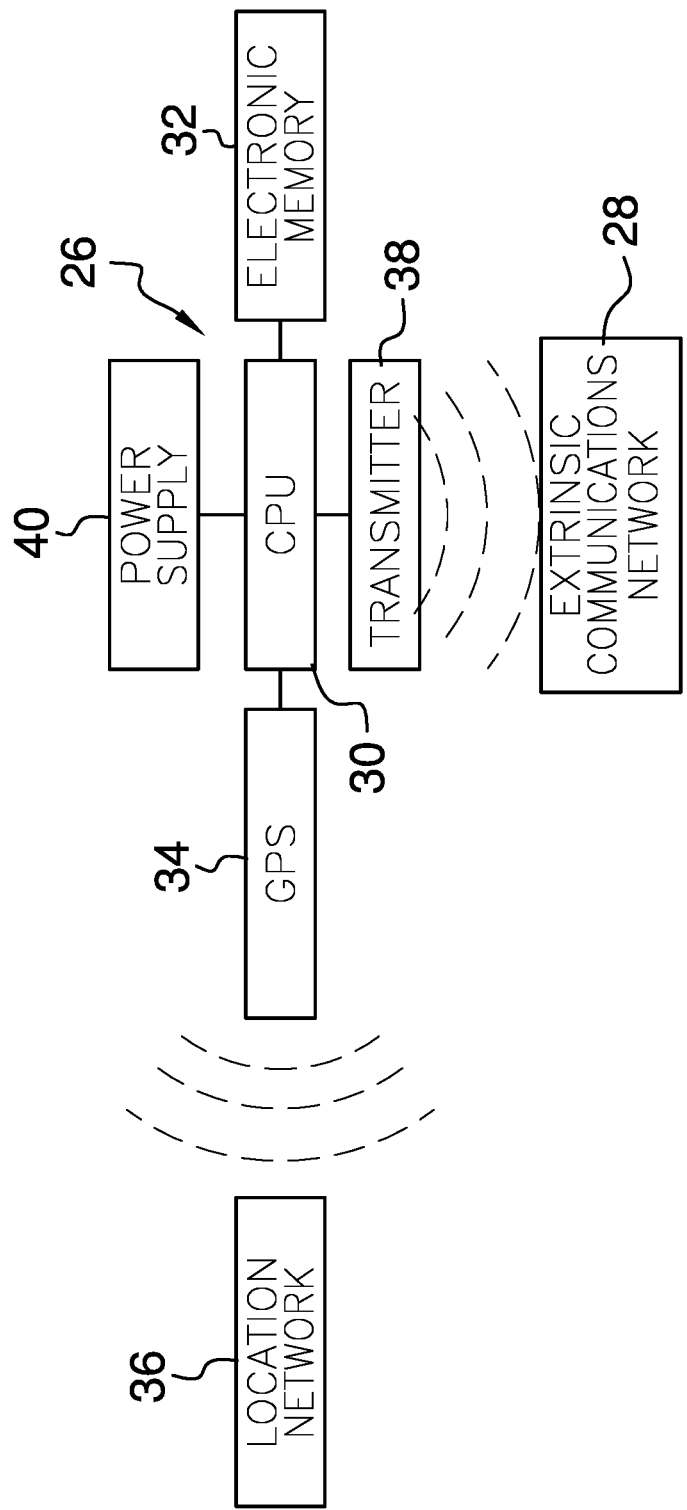
FIG. 3 is a schematic view of an embodiment of the disclosure.
Figure 4:
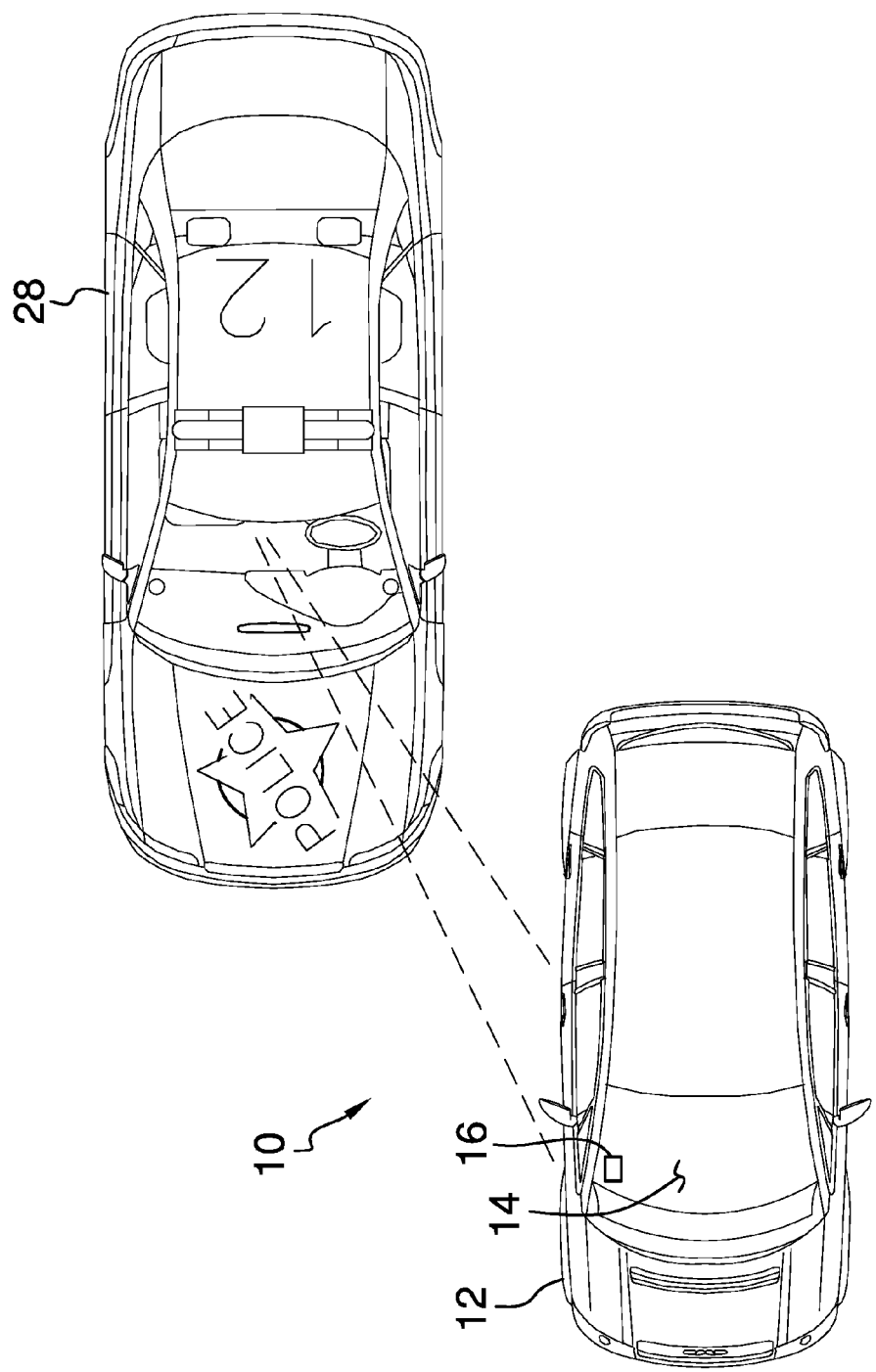
FIG. 4 is a perspective in-use view of an embodiment of the disclosure.

With reference now to the drawings, and in particular to FIGS. 1 through 4 thereof, a new tracking device embodying the principles and concepts of an embodiment of the disclosure and generally designated by the reference numeral 10 will be described.

As best illustrated in FIGS. 1 through 4, the electronic tracking system 10 generally comprises a vehicle 12 that has an outer surface 14. The vehicle 12 may be a passenger vehicle or the like. A decal 16 is adhered to the vehicle 12 and the decal has a front surface 18 and a back surface 20. The front surface 18 has indicia 22 printed thereon. The decal 16 may comprise a safety inspection sticker or other decal 16 that requires annual renewal or certification. The indicia 22 may comprise words and numbers corresponding to the vehicle 12.

The back surface 20 has an adhesive layer 24 adhered thereto. The adhesive layer 24 completely covers the back surface 20. The adhesive layer 24 adhesively engages the outer surface 14 of the vehicle 12 such that the indicia 22 are visible. The adhesive layer 24 may comprise a non residual adhesive or the like.

A tracking unit 26 is coupled to the decal 16. The tracking unit 26 is in electrical communication with an extrinsic communications network 28. The extrinsic communications network 28 may comprise a law enforcement communications network or the like. A location of the vehicle 12 may be communicated to the extrinsic communications network 28.

The tracking unit 26 comprises a processor 30 that is attached to the back surface 20 of the decal 16. The processor 30 may comprise an electronic processor or the like. An electronic memory 32 is attached to the back surface 20 and the electronic memory 32 is electrically coupled to the processor 30. The electronic memory 32 contains data specific to the vehicle 12 and the electronic memory 32 may comprise ROM memory or the like.

A global positioning unit 34 is attached to the back surface 20 and the global positioning unit 34 is electrically coupled to the processor 30. The global positioning unit 34 is in electrical communication with a location network 36. The location network 36 may comprise a global positioning satellite or the like. Thus, the global positioning unit 34 determines a location of the vehicle 12 with respect to Earth.

A transmitter 38 is attached to the back surface 20 and the transmitter 38 is electrically coupled to the processor 30. The transmitter 38 is in electrical communication with the extrinsic communications network 28. Thus, the transmitter 38 may transmit the location of the vehicle 12 to the extrinsic communications network 28. A power supply 40 is attached to the back surface 20 and the power supply 40 is electrically coupled to the processor 30. The power supply 40 comprises at least one battery 42. The tracking unit 26 may alternatively be attached to a credit card, driver's license, passport or other object typically carried by an individual.

In use, the decal 16 is adhered to the outer surface 14 of the vehicle 12. The extrinsic communications network 28 tracks the location of the vehicle 12 when the vehicle 12 is involved in the commission of a crime. The tracking unit 26 reduces the need for high speed chasing or other dangerous means of tracking the vehicle 12 when vehicle 12 is involved in the commission of the crime. Additionally, the tracking unit 26 facilitates the vehicle 12 to be recovered if the vehicle 12 is stolen.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic tracking system comprising:
a vehicle;
a decal being adhered to said vehicle; and
a tracking unit being coupled to said decal, said tracking unit being configured to be in electrical communication with an extrinsic communications network thereby facilitating a location of said vehicle to be tracked via the extrinsic communications network; and
wherein said decal has a front surface and a back surface, said front surface having indicia being printed thereon, said back surface having an adhesive layer being adhered thereto, said adhesive layer adhesively engaging said outer surface of said vehicle such that said indicia is visible.

2. The system according to claim 1, wherein:
said decal has a back surface; and
said tracking unit comprises:
a processor being attached to said back surface of said decal, and
an electronic memory being attached to said back surface, said electronic memory being electrically coupled to said processor, said electronic memory containing data specific to said vehicle.

3. The system according to claim 2, further comprising a global positioning unit being attached to said back surface, said global positioning unit being electrically coupled to said processor, said global positioning unit being configured to be in electrical communication with a location network thereby facilitating said global positioning unit to determine a location of said vehicle with respect to Earth.

4. The system according to claim 2, further comprising a transmitter being attached to said back surface, said transmitter being electrically coupled to said processor, said transmitter being configured to be in electrical communication with the extrinsic communications network thereby facilitating said transmitter to transmit the location of said vehicle to the extrinsic communications network.

5. The system according to claim 2, further comprising a power supply being attached to said back surface, said power supply being electrically coupled to said processor, said power supply comprising at least one battery.

6. An electronic tracking system comprising:
a vehicle having an outer surface;
a decal being adhered to said vehicle, said decal having a front surface and a back surface, said front surface having indicia being printed thereon, said back surface having an adhesive layer being adhered thereto, said adhesive layer adhesively engaging said outer surface of said vehicle such that said indicia is visible; and
a tracking unit being coupled to said decal, said tracking unit being configured to be in electrical communication with an extrinsic communications network thereby facilitating a location of said vehicle to be tracked via the extrinsic communications network, said tracking unit comprising:
a processor being attached to said back surface of said decal,
an electronic memory being attached to said back surface, said electronic memory being electrically coupled to said processor, said electronic memory containing data specific to said vehicle,
a global positioning unit being attached to said back surface, said global positioning unit being electrically coupled to said processor, said global positioning unit being configured to be in electrical communication with a location network thereby facilitating said global positioning unit to determine a location of said vehicle with respect to Earth,
a transmitter being attached to said back surface, said transmitter being electrically coupled to said processor, said transmitter being configured to be in electrical communication with the extrinsic communications network thereby facilitating said transmitter to transmit the location of said vehicle to the extrinsic communications network, and
a power supply being attached to said back surface, said power supply being electrically coupled to said processor, said power supply comprising at least one battery.

* * * * *